US007992752B2

(12) United States Patent
Oetlinger

(10) Patent No.: US 7,992,752 B2
(45) Date of Patent: Aug. 9, 2011

(54) BLANKING TOOL AND A METHOD OF ASSEMBLING THE BLANKING TOOL

(75) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 566 days.

(21) Appl. No.: 11/478,979

(22) Filed: Jun. 30, 2006

(65) Prior Publication Data

US 2007/0170221 A1 Jul. 26, 2007

Related U.S. Application Data

(60) Provisional application No. 60/695,319, filed on Jun. 30, 2005.

(51) Int. Cl.

*B26F 3/00* (2006.01)
*B65H 35/00* (2006.01)
*B26D 7/26* (2006.01)
*F16B 7/10* (2006.01)
*F16B 7/04* (2006.01)
*F16D 1/12* (2006.01)

(52) U.S. Cl. ......... 225/93; 225/104; 83/698.31; 403/82; 403/400

(58) Field of Classification Search .................... 225/93, 225/104; 83/698.31; 403/400, 82, 331
See application file for complete search history.

(56) References Cited

U.S. PATENT DOCUMENTS

| | | | | | |
|---|---|---|---|---|---|
| 4,345,849 | A | * | 8/1982 | Stenemann | 403/252 |
| 4,913,016 | A | * | 4/1990 | Frei | 83/103 |
| 5,269,619 | A | * | 12/1993 | Warkus et al. | 403/240 |
| 5,494,327 | A | * | 2/1996 | Derecktor | 296/3 |
| 5,664,793 | A | * | 9/1997 | Engibarov | 279/124 |
| 6,786,522 | B2 | * | 9/2004 | Kench et al. | 296/3 |
| 6,820,344 | B2 | * | 11/2004 | Haage et al. | 33/436 |
| 7,465,000 | B2 | * | 12/2008 | Huang | 312/333 |
| 2005/0205746 | A1 | * | 9/2005 | Jung et al. | 248/429 |

* cited by examiner

*Primary Examiner* — Ghassem Alie
*Assistant Examiner* — Bharat C Patel
(74) *Attorney, Agent, or Firm* — Boyle Fredrickson, S.C.

(57) ABSTRACT

A blanking tool includes a lower blanking frame and a receiver tool. The lower blanking frame includes running rails and cross rails. A first cross rail extends substantially perpendicular to the first running rail and coupled to first and second running rails. A second cross rail is disposed substantially parallel to the first cross rail and coupled to the first and second running rails. The receiver tool includes receiver rails mounting assemblies. A first receiver rail is alongside and coupled to the first running rail. A second receiver rail is alongside and coupled to the second running rail. The second receiver rail is coupled to the second mounting assembly that is further operably coupled to the first frame member, and is further disposed on the second frame member. The mounting assemblies slide along the slot relative to one another when the mounting assemblies have an unlocked operational position.

6 Claims, 12 Drawing Sheets

BLANKING TOOL AND A METHOD OF ASSEMBLING THE BLANKING TOOL

CROSS REFERENCE TO RELATED APPLICATIONS

The application claims the benefit of U.S. Provisional application Ser. No. 60/695,319, filed Jun. 30, 2005, the contents of which are incorporated herein by reference thereto.

TECHNICAL FIELD

This application relates to a blanking tool for use with a die-cutting machine.

BACKGROUND

Die cutting machines have been developed to cut cardboard or paper sections into smaller portions. Generally, the die cutting machines utilize a punch member and a blanking frame. The blanking frame is configured to hold the cardboard in the die cutting machine.

Further, the size and shape of the cardboard being cut by the die cutting machine can vary considerably. To accommodate the various cardboard configurations, a plurality of different blanking frames having different shapes and sizes has been utilized to support the various cardboard configurations. A problem with this design approach is that the mounting of the plurality of different blanking frames to the die cutting machine has been relatively difficult.

Accordingly, the inventor herein has recognized a need for a blanking tool that has a receiver tool that is configured to fixedly hold one of a plurality of different blanking frames on a die cutting machine.

SUMMARY OF THE INVENTION

A blanking tool for use with a die cutting machine in accordance with an exemplary embodiment is provided. The die cutting machine includes first and second frame members disposed in a substantially parallel spaced relationship with respect to one another. The first frame member has a slot extending along the first frame member. The blanking tool includes a lower blanking frame and a receiver tool. The lower blanking frame includes first and second running rails and first and second cross rails. The first running rail extends in a first direction. The second running rail is disposed in a substantially parallel spaced relationship with respect to the first running rail. The first cross rail extends in a second direction substantially perpendicular to the first running rail and coupled to the first and second running rails. The second cross rail is disposed in a substantially parallel spaced relationship with respect to the first cross rail and coupled to the first and second running rails. The receiver tool includes first and second receiver rails and first and second mounting assemblies. The first receiver rail is disposed alongside and coupled to the first running rail. The first receiver rail has a first end portion and a second end portion. The first end portion is coupled to the first mounting assembly that is further operably coupled to the first frame member. The second end portion is disposed on the second frame member. The second receiver rail is disposed alongside and coupled to the second running rail. The second receiver rail has a third end portion and a fourth end portion. The third end portion is coupled to the second mounting assembly that is further operably coupled to the first frame member. The fourth end portion disposed on the second frame member. The blanking tool is further configured so the first and second mounting assemblies can slidably engage the slot of the first frame member such that the first and second mounting assemblies slide along a length of the slot relative to one another when the first and second mounting assemblies have an unlocked operational position A method of assembling a blanking tool for use with a die cutting machine in accordance with another exemplary embodiment is provided. The die cutting machine includes first and second frame members disposed in a substantially parallel spaced relationship with respect to one another. The first frame member has a slot extending along the first frame member. The blanking tool includes a lower blanking frame and a receiver tool. The lower blanking frame includes first and second running rails and first and second cross rails. The first and second running rails extend in a first direction disposed in a substantially parallel spaced relationship with respect to each other. The first cross rail extends in a second direction substantially perpendicular to the first running rail and coupled to the first and second running rails. The second cross rail is disposed in a substantially parallel spaced relationship with respect to the first cross rail and coupled to the first and second running rails. The receiver tool includes first and second receiver rails and first and second mounting assemblies. The first receiver rail has first and second end portions. The first end portion is coupled to the first mounting assembly. The second end portion of the first receiver rail is disposed on the second frame member. The second receiver rail has third and fourth end portions. The third end portion is coupled to the second mounting assembly. The fourth end portion of the second receiver rail is disposed on the second frame member. The method includes sliding the first and second mounting assemblies relative to each other along the slot of the first frame member to first and second positions, respectively, such that the distance between the first and second receiver rails substantially equals the distance between the first and second running rails of the lower blanking frame. The method further includes placing the first mounting assembly in a locked operational position to fixedly couple the first mounting assembly to the first frame member. The method further includes placing the second mounting assembly in a locked operational position to fixedly couple the second mounting assembly to the first frame member. The method further includes disposing the lower blanking frame on the receiver tool such that the first running rail is disposed alongside the first receiver rail and the second running rail is disposed alongside the second receiver rail. The method further includes coupling the first running rail to the first receiver rail using a first coupler. The method further includes coupling the second running rail to the second receiver rail using a second coupler.

A blanking tool system including a die cutting machine and a blanking tool in accordance with another exemplary embodiment is provided. The die cutting machine has at least one punch member and first and second frame members coupled to the die cutting machine. The first and second frame members are disposed in a substantially parallel spaced relationship to one another. The first frame member has a slot extending therein. The blanking tool has a lower blanking tool frame for holding a cardboard member and a receiver tool. The lower blanking frame has first and second running rails and first and second cross rails. The first and second running rails extend in a first direction and are disposed in a substantially parallel spaced relationship with respect to each other. The first cross rail extends in a second direction substantially perpendicular to the first running rail and is coupled to the first and second running rails. The second cross rail is disposed in a substantially parallel spaced relationship with respect to the first cross rail and is coupled to the first and second running rails. The receiver tool has first and second receiver rails and first and second mounting assemblies. The first receiver rail has first and second end portions. The first end portion is coupled to the first mounting assembly. The second end portion is disposed on the second frame member. The second receiver rail has third and fourth end portions. The third end portion is coupled to the second mounting assembly. The fourth end portion is disposed on the second frame member. The punch member of the die cutting machine is configured to move into an interior region defined by the first and second running rails and the first and second cross rails to urge a section of the cardboard member through the interior region to a position beneath the blanking tool.

DETAILED DESCRIPTION OF EXEMPLARY EMBODIMENTS

Figure 1:
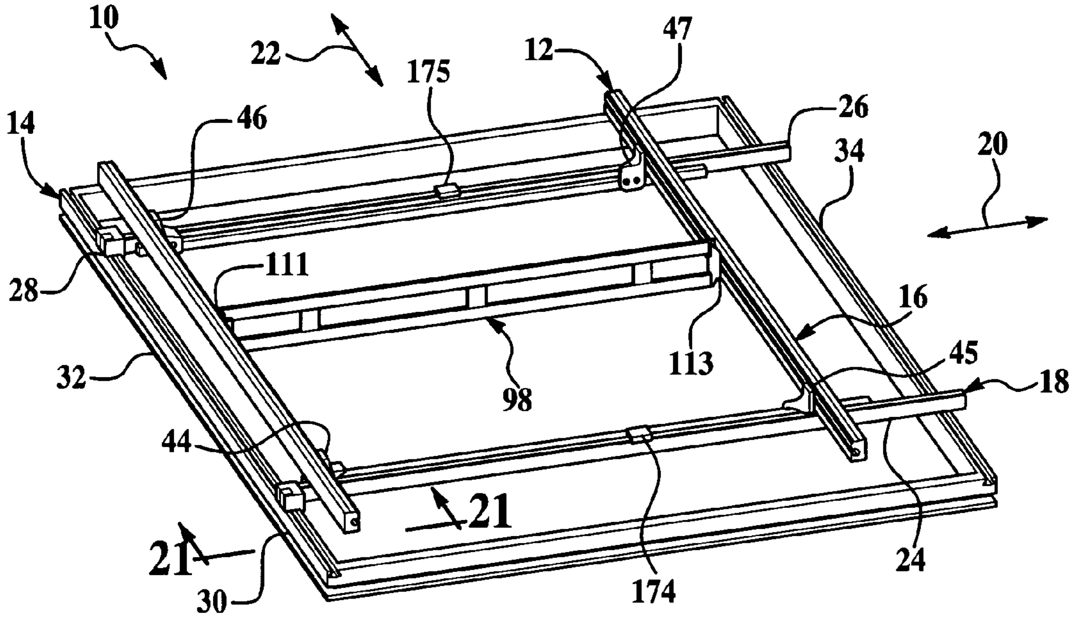
FIG. 1 is a perspective view of a blanking tool having a receiver tool and a lower blanking frame, the receiver tool being mounted to a frame of a die cutting machine, the lower blanking frame being mounted to the receiver tool, in accordance with an exemplary embodiment.
Figure 2:
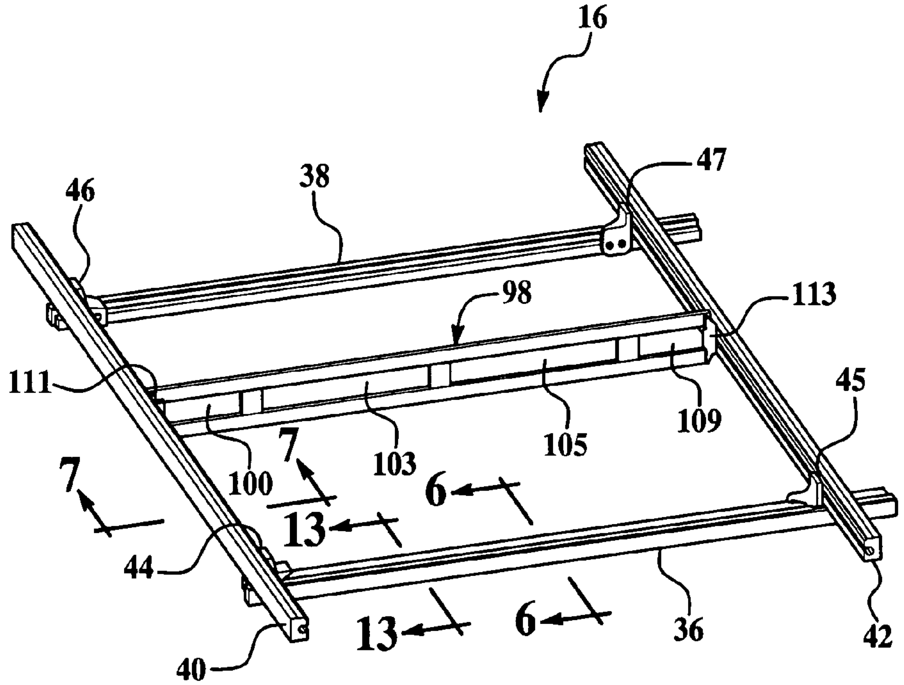
FIG. 2 is a perspective view of the lower blanking frame of the blanking tool of FIG. 1.
Figure 30:
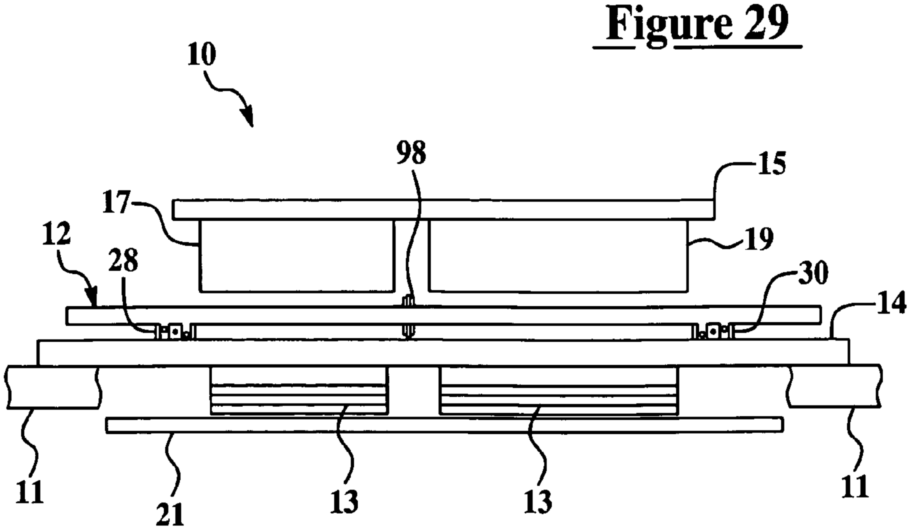
FIG. 30 is a partial cross sectional view of a blanking system showing components of a die cutting machine, the blanking tool, the frame, and stacks of cardboard sections disposed on a platform.

Referring to FIGS. 1,2 and 30, a blanking tool system 10 for use with a die cutting machine 11 utilized for cutting cardboard or other materials in accordance with an exemplary embodiment is illustrated. The blanking tool system 10 includes a blanking tool 12 coupled to a frame 14 that is further coupled to die-cutting machine 11. Blanking tool 12 includes a lower blanking frame 16 and a receiver tool 18. Receiver tool 18 is provided to receive and hold various configurations of lower blanking frame 16 on frame 14. Lower blanking frame 16 is provided to support cardboard or other materials and is coupled to receiver tool 18. Receiver tool 18 is configured to be slidably moved to various positions along frame 14 for receiving lower blanking frames of various sizes and shapes, as will be explained in greater detail below.

Lower blanking frame 16 includes running rails 36,38 disposed in a running direction 20 and cross rails 40, 42 disposed in a cross direction 22. Receiver tool 18 comprises a receiver rail 24 disposed in the running direction 20, a receiver rail 26 spaced apart and substantially parallel to receiver rail 24, a mounting assembly 28, and a mounting assembly 30. Mounting assembly 30 couples to an end portion of receiver rail 24. Mounting assembly 28 couples to an end portion of receiver rail 26. Mounting assemblies 28, 30 are configured to be releasably coupled to frame 14, thereby coupling receiver tool 18 to frame 14.

Frame 14 is provided to support and hold blanking tool 12. Frame 14 can be a portion of the die cutting machine structure or structure attached to the die cutting machine. Frame 14 includes at least a frame member 32 and a frame member 34. In this embodiment, surfaces of frame members 32, 34 form the mounting plane or surfaces configured to align blanking tool 12 to a predetermined position with respect to the die-cutting machine.

Blanking tool 12 is configured so that receiver tool 18 remains attached to frame 14 when mounting lower blanking frame 16 to receiver tool 18. In particular, mounting assemblies 28, 30 attached to receiver rails 24, 26, respectively, are configured to be slidably repositioned on frame member 32 to receive lower blanking frame 16. Lower blanking frame 16 is then coupled to receiver tool 18. Then, mounting assemblies 28, 30 are placed in a locked operational position and are thereby fixedly coupled to frame member 32.

Figure 3:
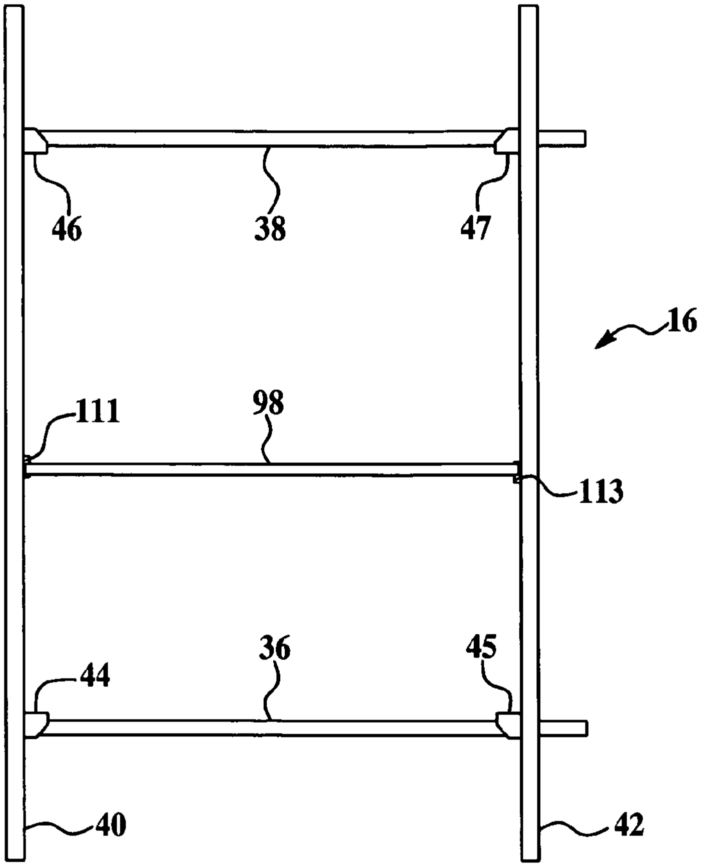
FIG. 3 is top view of the lower blanking frame of FIG. 2.

Referring to FIGS. 2 and 3, lower blanking frame 16 is provided to hold cardboard or other materials thereon during a cutting of the cardboard by the die cutting machine. Lower blanking frame 16 comprises a plurality of elongated intersecting members forming interior regions through which portions of the cardboard or paper are urged through in the die cutting machine. In particular, lower blanking frame 16 includes running rails 36, 38, cross rails 40, 42, and corner fittings 44, 45, 46, 47. Running rail 36 extends in the running direction 20. Running rail 38 is spaced apart from and substantially parallel to running rail 36. Cross rail 40 extends in the cross direction 22 with respect to running rails 36, 38 such that cross rail 40 intersects each running rail 36, 38 leaving an unsupported intermediate length of cross rail 40. Cross rail 42 is spaced apart from and substantially parallel to cross rail 40 and intersects each running rail 36, 38 leaving an unsupported intermediate length of cross rail 42.

Referring to FIGS. 2-5, cross rail 40 is coupled to running rail 36 with corner fitting 44. Cross rail 40 is also coupled to running rail 38 with corner fitting 46. Cross rail 42 is coupled to running rail 36 with corner fitting 45. Cross rail 42 is also coupled to running rail 38 with corner fitting 47. Corner fittings 44, 45, 46, 47 are configured to couple cross rails 40, 42 to respective running rails 36, 38 so that cross rails 40, 42 are substantially perpendicular to running rails 36, 38.

Figure 6:
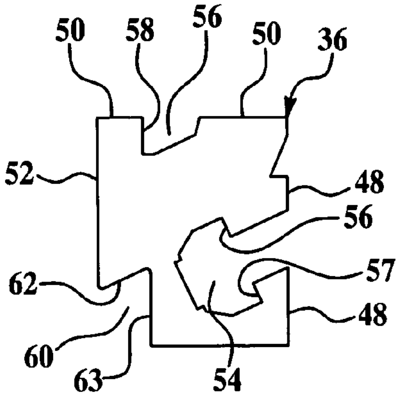
FIG. 6 is a cross section along lines 6-6 of FIG. 2 of a first running rail.

Referring to FIGS. 2 and 6, an exemplary embodiment of running rails 36, 38 is illustrated. Running rails 36, 38 are substantially elongated bar shaped members, but not limited to that shape or length illustrated. Running rails 36, 38 are configured to include various surfaces for contacting portions of cross rails 40, 42, receiver rails 24, 26, or fittings (e.g. corner fittings).

Because the configuration of running rail 38 is substantially similar to running rail 36, only the configuration of running rail 36 will be described in detail. Running rail 36 includes surfaces 48, 50, and 52. Surface 48 includes a groove 54 extending into the cross section of running rail 36. Groove 54 defines interior surfaces 56, 57 configured to receive a portion of a fastener and/or fastener retaining members such as washers or retaining bars. In this exemplary embodiment, groove 54 extends into running rail 36 at an acute angle. Additionally, groove 54 is further configured as an elongated groove that extends substantially the full length of running rail 36. In alternative embodiments, groove 54 can be configured with a shorter length, and to enter running rail 36 at a different angle. Further, groove 54 can comprise a plurality of distinct groove portions disposed at specific locations along the length of running rail 36.

Surface 50 is configured to contact a portion of corner fittings 44, 45, 46, 47 or portions of cross rails 40, 42. Surface 50 includes a groove 56 defining an interior surface 58. Groove 56 is configured to receive clamp members or fittings for coupling running rail 36 to receiver rail 24.

Surface 52 is configured to slidably receive or abut to portions of receiver rail 24. In this embodiment, running rail 36 includes a groove 60 extending into surface 52. Groove 60 defines interior surfaces 62, 63. Groove 60 of running rail 36 is configured to receive and align with a portion of the receiver rail 24 when coupling lower blanking frame 16 to receiver tool 18. The configuration of groove 60 can vary depending on the configuration of blanking tool 12 and its intended use in the die cutting machine.

Figure 7:
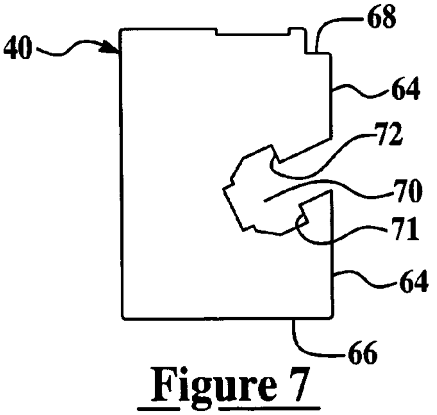
FIG. 7 is a cross section along lines 7-7 of FIG. 2 of a first cross rail.

Referring to FIGS. 2 and 7, an exemplary embodiment of a cross section of cross rails 40, 42 is illustrated. Cross rails 40, 42 are substantially elongated bar shaped members, but not limited to that shape or length illustrated. Cross rails 40, 42 are configured to include various surfaces for contacting or coupling to portions of running rails 36, 38, receiver rails 24, 26, or fittings (e.g. corner fittings).

Because the configuration of cross rail 40 is substantially similar to cross rail 42, only the configuration of cross rail 40 will be discussed in detail. Cross rail 40 includes surfaces 64, 66, and upper lip surface 68. Surface 64 includes a groove 70 extending into the cross section of cross rail 40. Groove 70 defines interior surfaces 71, 72 configured to receive a portion of a fastener and/or fastener retaining members such as washers or retaining bars. In this embodiment, groove 70 extends into cross rail 40 at an acute angle. Additionally, groove 70 is further configured as an elongated groove that extends substantially the full length of cross rail 40. In alternative embodiments, groove 70 can be configured with a shorter length, and to enter surface 64 at a different angle. Further, groove 70 can comprise a plurality of distinct groove portions disposed at specific locations along the length of cross rail 40.

Figure 8:
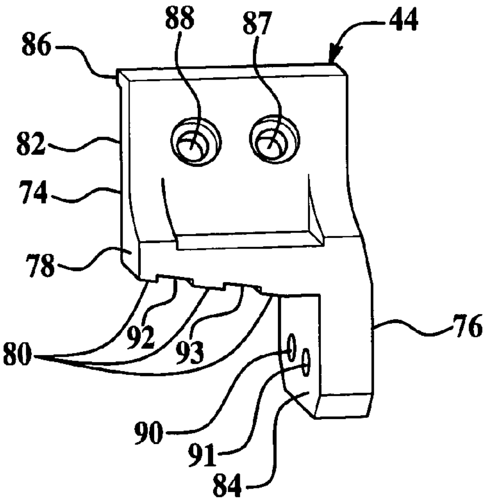
FIGS. 8-10 are perspective views of a first corner fitting used to couple a first running rail to a first cross rail.
Figure 9:
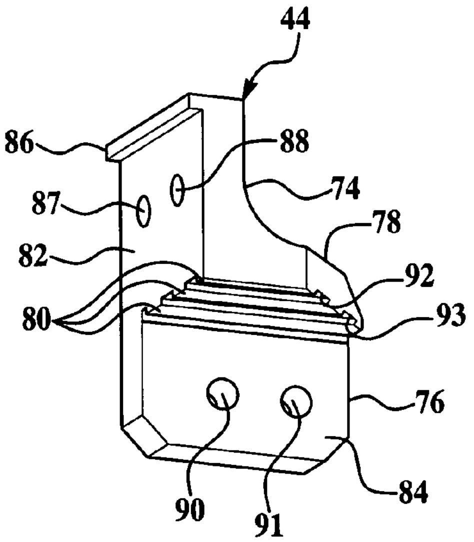
Figure 10:
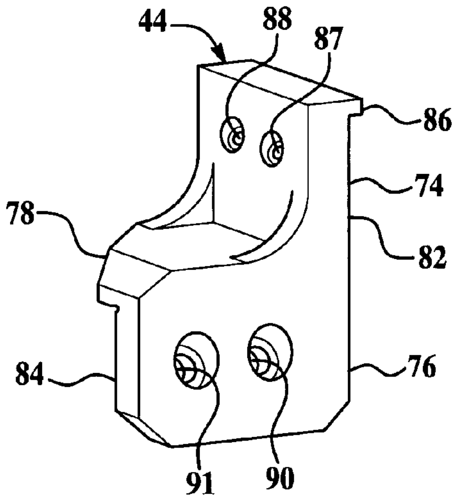

Referring to FIGS. 8-10, an exemplary embodiment corner fitting 44 is illustrated. Corner fitting 44 is substantially similar to corner fitting 47, therefore only corner fitting 44 will be discussed in detail. Corner fitting 44 is configured to couple running rail 36 to cross rail 40 so that running rail 36 is substantially perpendicular to cross rail 40 in two planes.

Figure 4:
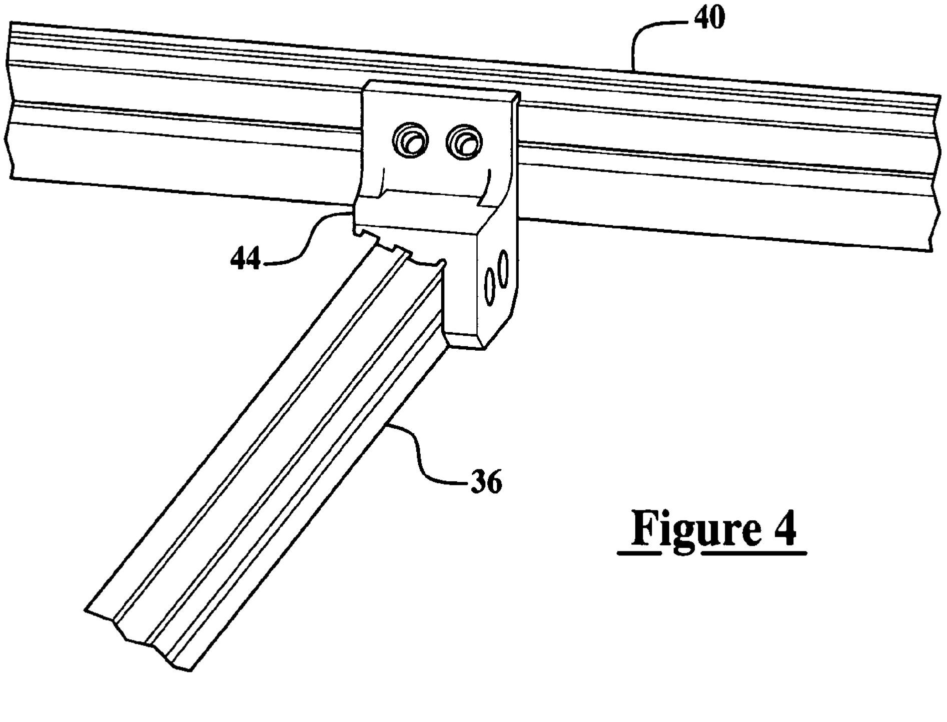
FIG. 4 is a perspective view of a first corner fitting used to couple a first running rail to a first cross rail of the lower blanking frame.

Corner fitting 44 includes an upper leg 74, a lower leg 76, and a central portion 78. Upper leg 74 and lower leg 76 each depend away from central portion 78. Central portion 78 includes a surface 80. Upper leg 74 includes a surface 82. Lower leg 76 includes a surface 84. Surfaces 80, 82, and 84 are configured to contact portions of running rail 36 and cross rail 40 in a manner to maintain perpendicularity in two planes of running rail 36 with respect to cross rail 40 when coupled together via corner fitting 44. In this embodiment, surfaces 82 and 84 are substantially perpendicular to surface 80. Additionally, upper leg 74 includes an upper lip portion 86 that depends away from surface 82 wherein lip portion 86 is configured to engage a portion of cross rail 40 as illustrated in FIG. 4.

Corner fitting 44 further includes at least one aperture configured to aid in coupling corner fitting 44 to running rail 36 or cross rail 40. As illustrated, upper leg 74 includes two apertures 87, 88 extending through upper leg 74 at an acute angle. Lower leg 76 includes two apertures 90, 91 extending through lower leg 76 at an acute angle. In a further exemplary embodiment, surface 80 of central portion 78 includes a plurality of grooves 92, 93. Grooves 92, 93 are configured to aid in machining various features of corner fitting 44 to relatively tight tolerances.

Figure 11:
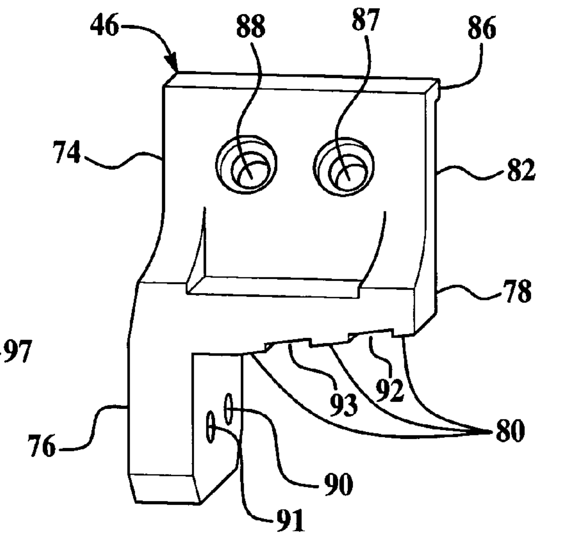
FIG. 11 is a perspective view of a second corner fitting used to couple a first running rail to a second cross rail.

Referring to FIG. 11, an exemplary embodiment of corner fitting 46 is illustrated. Corner fitting 46 is substantially similar to corner fitting 44, except for the orientation of lower leg 76 with respect to upper leg 74. Specifically, lower leg 76 is on the left hand side when corner fitting 46 is viewed so that surface 82 of upper leg 74 faces away from the observer, as illustrated in FIG. 11. Whereas, lower leg 76 is on the right hand side when corner fitting 44 is viewed so that surface 82 of upper leg 74 faces away from the observer, illustrated in FIG. 8.

Referring to FIG. 2, corner fitting 44 is configured to couple running rail 36 to cross rail 40. Corner fitting 46 is configured to couple running rail 38 to cross rail 40. It should be noted that corner fitting 45 is substantially similar to corner fitting 46. Corner fitting 45 is positioned diagonally across from corner fitting 46 and couples running rail 36 to cross rail 42. Additionally, corner fitting 47 is substantially similar to corner fitting 44. Corner fitting 47 is positioned diagonally across from corner fitting 44 and couples running rail 38 to cross rail 42.

Figure 5:
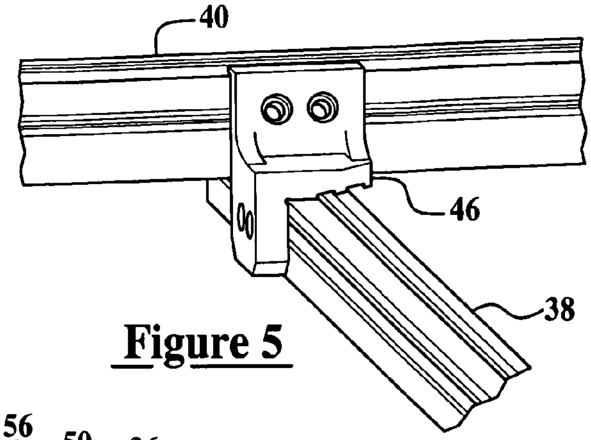
FIG. 5 is a perspective view of a second corner fitting used to couple a first running rail to a second cross rail of the lower blanking frame.

Referring to FIG. 4, an enlarged view of corner fitting 44 for coupling running rail 36 to cross rail 40 is illustrated. Referring to FIG. 5, an enlarged view of corner fitting 46 for coupling running rail 38 to cross rail 40 is illustrated.

Figure 12:
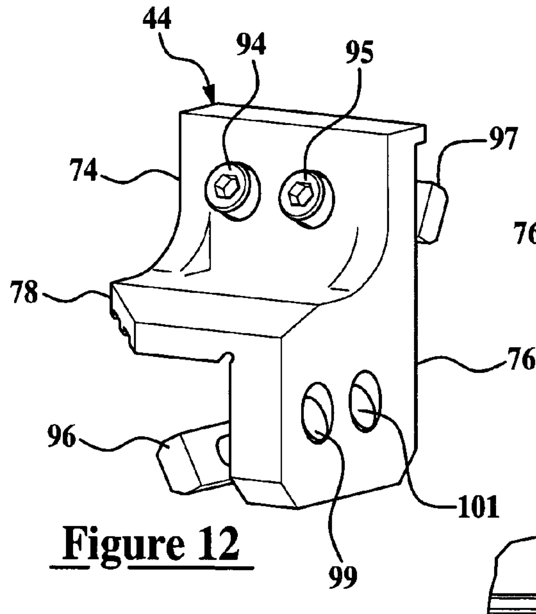
FIG. 12 is a perspective view of the first corner fitting showing how fasteners and retainer bars are used to couple a running rail to a cross rail.
Figure 13:
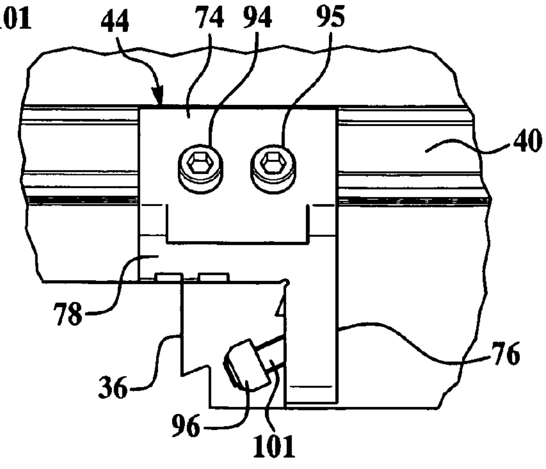
FIG. 13 is a partial cross sectional view along lines 13-13 of FIG. 2 showing the first corner fitting coupling the first running rail to the second cross rail using the fasteners and retainer bars of FIG. 12.

Referring to FIGS. 12 and 13, fastening elements used with corner fittings 44, 45, 46, 47 are illustrated. In this embodiment, corner fitting 44 couples running rail 36 to cross rail 40 with fasteners 94, 95, 99, 101 and retainer bars 96, 97. Retainer bar 96 is slidably inserted into the elongated groove 54 of running rail 36. Retainer bar 97 is slidably inserted into the elongated groove 70 of cross rail 40. Retainer bar 96 is configured with a pair of spaced threaded apertures (not shown) that correspond to apertures 90, 91 in lower leg 76 of corner fitting 44. Retainer bar 97 is also configured with a pair of spaced threaded apertures (not shown) that correspond to apertures 87, 88 in upper leg 74 of corner fitting 44. Retainer bars 96, 97 are positioned in the elongated grooves 54, 70, respectively, where corner fitting 44 will couple running rail 36 to cross rail 40. Fasteners 94, 95 are configured to engage the threaded apertures in retainer bar 97. Fasteners 94, 95 are used to urge retainer bar 97 against interior surface 71, 72 of groove 70 of cross rail 40 to couple corner fitting 44 to cross rail 40. As fasteners 94, 95 are rotated in a tightening direction, the retainer bar 97 urges cross rail 40 and corner fitting 44 together. Fasteners 99, 101 are configured to engage the threaded apertures in retainer bar 96. Fasteners 99, 101 are used to urge retainer bar 96 against interior surface 56, 57 of groove 54 of running rail 36 to couple corner fitting 44 to running rail 36. As fasteners 99, 95 are rotated in a tightening direction, the retainer bar 97 urges cross rail 40 and corner fitting 44 together.

Figure 14:
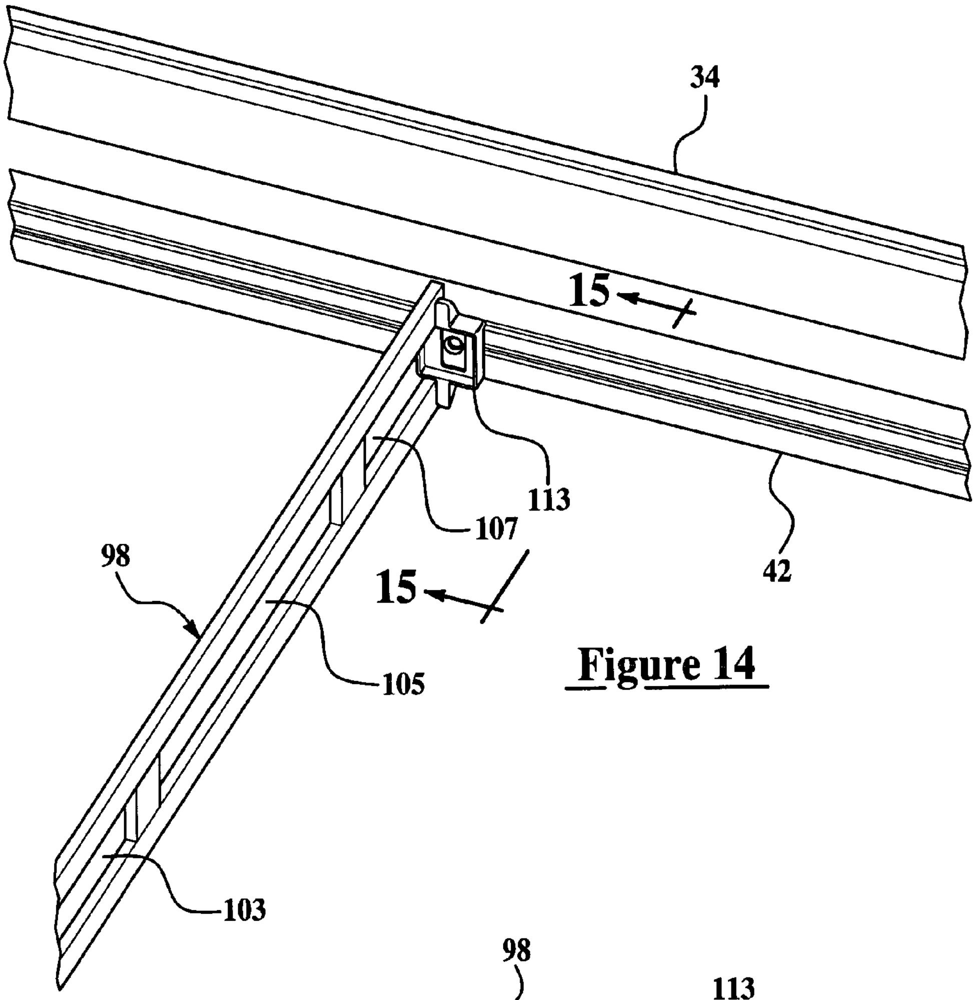
FIG. 14 is a perspective view of a beam coupled to the second cross rail.
Figure 15:
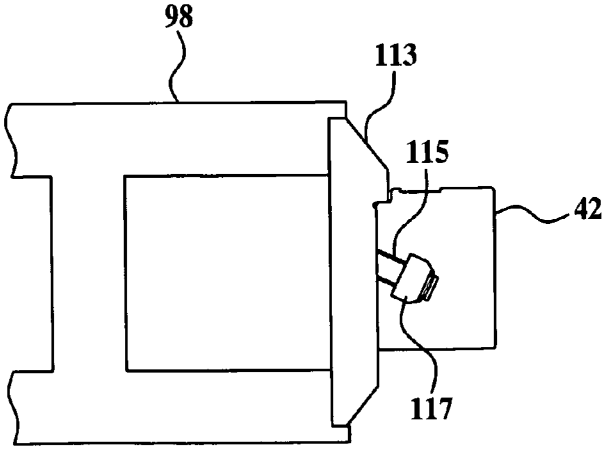
FIG. 15 is a cross sectional view along lines 15-15 of FIG. 14 of the beam coupled to the first cross rail.

Referring to FIGS. 1-3, and 14 and in an exemplary embodiment, lower blanking frame 16 further includes a beam 98. Beam 98 is configured to aid in stabilizing lower blanking frame 16 during cutting operations. Beam 98 is further configured to permit sensors to detect a stack height of cardboard piled on top of a stacking mechanism disposed below the lower blanking frame 16. As illustrated in FIG. 14, beam 98 is a substantially elongated, thin rectangular member. Beam 98 is configured to include at least one aperture extending therethrough. A light sensor can detect the cardboard stack heights on each side of the beam 98 using the aperture. In this embodiment, beam 98 includes a plurality of elongated apertures 100, 103, 105, 109. In alternative embodiments, the number, configuration, and position of apertures can vary depending on the configuration of lower blanking frame 16 and the configuration and purpose of the sensors used with the blanking tool 12. Beam 98 further includes beam fittings 111, 113 each coupled to an end of beam 98. Beam fitting 111 is configured to couple a first end portion of beam 98 to cross rail 40. Beam fitting 113 is configured to couple a second end portion of beam 98 to cross rail 42. Beam fittings 111, 113 and first and second end portions of beam 98 are configured so beam fitting 111 and 113 can be welded to respective first and second end portions of beam 98. Additionally, in this embodiment, beam fittings 111, 113 are configured to be coupled to respective cross rails 40, 42 by using fastening methods similar to those used to couple running rails to cross rails. For instance, referring to FIG. 15, beam fitting 113 is coupled to cross rail 42 using a fastener 115 and a retainer bar 117.

Figure 16:
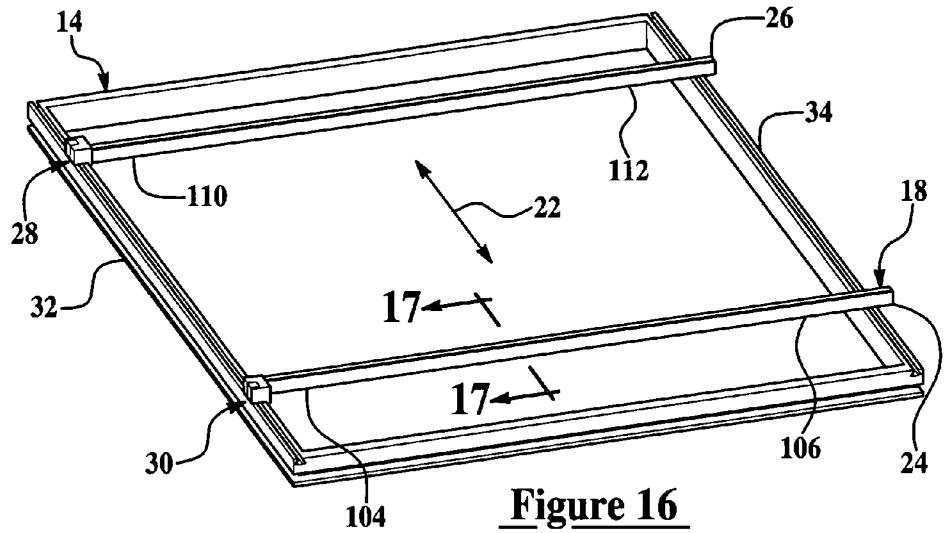
FIG. 16 is a perspective view of the receiver tool mounted to the frame of FIG. 1.

Referring to FIG. 16, receiver tool 18 for holding lower blanking frame 16 is provided. Mounting assemblies 28, 30 position receiver rails 24, 26 on frame 14. Specifically, receiver rail 24 is spaced apart from receiver rail 26 in the cross direction 22. The amount of space between receiver rails 24, 26 in the cross direction 22 substantially equals the distance between running rails 36, 38 of lower blanking frame 16. Further, once a lower blanking frame 16 configuration is coupled to receiver tool 18, the position of the receiver tool 18 and lower blanking frame 16 in the cross direction 22 can be changed without removing fasteners.

Receiver rail 24 is provided to support running rail 36. Receiver rail 24 includes end portion 104 and end portion 106. End portion 104 of receiver rail 24 is configured to be coupled to mounting assembly 30. Mounting assembly 30 is configured to be operably coupled to frame member 32. In an exemplary embodiment, end portion 106 of receiver rail 24 is configured to be coupled to frame member 34 with a clamping member.

Receiver rail 26 is provided to support running rail 38. Receiver rail 26 includes end portion 110 and end portion 112. End portion 110 of receiver rail 26 is configured to be coupled to mounting assembly 28. Mounting assembly 28 is configured to be operably coupled to frame member 32. In an exemplary embodiment, end portion 112 of receiver rail 26 is configured to be coupled to frame member 34 with a clamping member.

Figure 17:
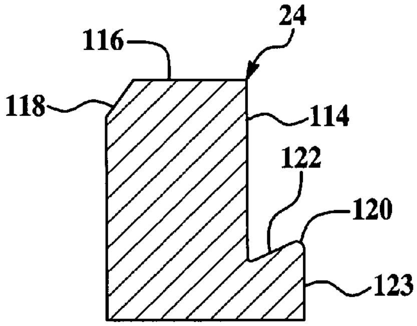
FIG. 17 is a cross sectional view along lines 17-17 of FIG. 16 of a receiver rail.
Figure 18:
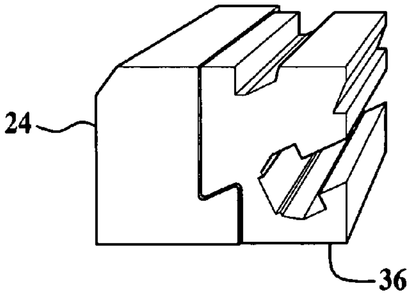
FIG. 18 is a perspective view of a running rail disposed alongside a receiver rail.

Referring to FIGS. 17 and 18, a cross section of receiver rail 24 is illustrated. Receiver rail 24 is substantially similar to receiver rail 26, therefore only the configuration of receiver rail 24 will be explained in detail. Further, because receiver rail 24 couples to running rail 36 in a similar fashion as receiver rail 26 couples to running rail 38 only the coupling of receiver rail 24 to running rail 36 will be discussed in detail. Receiver rail 24 is configured to receive a portion of respective running rail 36 of lower blanking frame 16. Receiver rail 24 includes surfaces 114, 116, and 118. Surfaces 114, 116, and 118 are configured to engage corresponding surfaces of running rail 36 or clamping fittings for coupling lower blanking frame 16 to receiver tool 18.

For example, surface 114 includes at lease one protrusion 120 depending away from surface 114. Protrusion 120 is configured to be slidably received within groove 60 of running rail 36. Surfaces 122, 123 defined by protrusion 120 contact surfaces 62, 63 defined by groove 60 of running rail 36 when running rail 36 is coupled to receiver rail 24. Protrusion 120 and groove 60 are configured to align running rail 36 with respect to receiver rail 24 when lower blanking frame 16 is coupled to receiver tool 18. Additionally, protrusion 120 and groove 60 are configured to ensure that lower blanking frame 16 remains coupled to and does not release from receiver tool 18 during cutting operations. It is to be noted that alternative embodiments of running rail 36 and receiver rail 24 include configurations where running rail 36 includes a protrusion configured to engage a corresponding groove or aperture of receiver rail 24.

Figure 19:
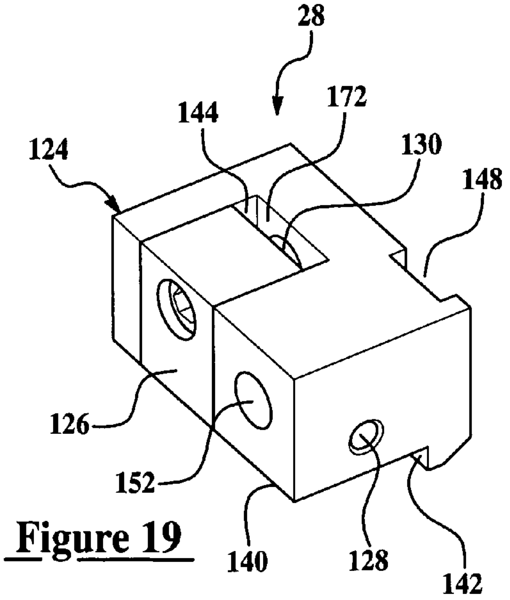
FIG. 19 is a perspective view of a first mounting assembly.
Figure 20:
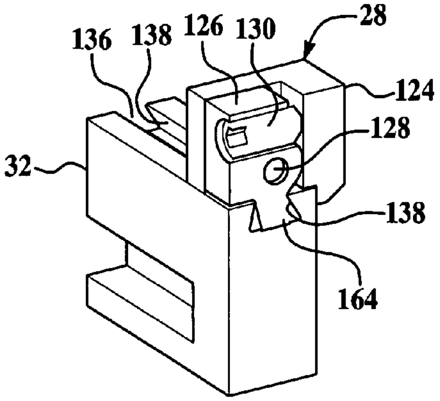
FIG. 20 is a partial perspective view of the first mounting assembly mounted to a first frame member.
Figure 21:
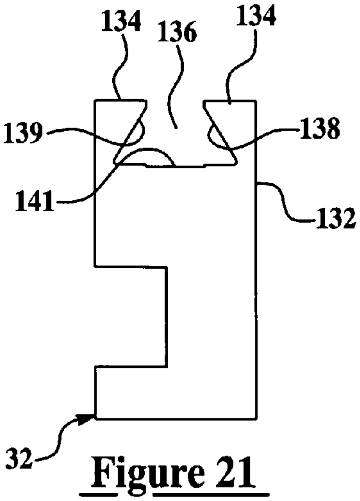
FIG. 21 is a cross sectional view along lines 21-21 of FIG. 1 of the first frame member.

Referring to FIGS. 19-21, illustrate mounting assembly 28 operably coupled to frame member 32 in accordance with an exemplary embodiment. Mounting assembly 30 is operably coupled to frame member 32 in a substantially similar configuration. Frame member 32 includes mounting surfaces 132 and 134 configured to be contacted by portions of mounting assemblies 28, 30. Surfaces 132, 134 are substantially perpendicular to each other. Surface 134 further includes a slot or groove 136 that extends into frame member 32. Groove 136 defines interior surfaces 138, 139, 141. At least one surface defined by groove 136 is configured to be contacted by a portion of an engaging fitting 126 of mounting member assembly 28. Further, the length of groove 136 extends substantially the length of frame member 32. In alternative embodiments, the configuration of groove 136 can vary.

Referring to FIGS. 16, 19 and 20, mounting assemblies 28, 30 are provided for coupling receiving rails 26, 24, respectively, to frame member 32. The configuration of mounting assembly 28 is substantially similar to mounting assembly 30, therefore only mounting assembly 28 will be discussed in detail. Mounting assembly 28 includes a mounting member 124, engaging fitting 126, a pin member 128, and a forcing member 130.

Referring to FIGS. 22-25, mounting member 124 is illustrated. Mounting member 124 includes mounting surfaces 140, 142, 143, grooves 144, 148, and apertures 146, 147, 150, and 152. Surface 142 is substantially perpendicular to surfaces 140 and 143. Surfaces 140, 143 are further configured to contact surface 134 of frame member 32, and surface 142 is configured to contact surface 132 of frame member 32 when mounting member assembly 28 is coupled to frame member 32.

Groove 144 is configured to receive a portion of engaging fitting 126 of mounting assembly 28. Groove 144 is channel shaped and extends through mounting member 124 substantially perpendicular to surfaces 140 and 143. Apertures 146, 147 are configured to receive pin member 128, as illustrated in FIG. 19. Apertures 146, 147 are extend through the portions of mounting member 124 on both sides of groove 144. Apertures 146, 147 are substantially coaxial and parallel to surfaces 140, 143. Groove 148 is configured to receive end portion 110 of receiver rail 26. Groove 148 is extends into a back surface 154 of mounting member 124. Groove 148 defines surfaces 156 configured to contact surfaces of end portion 110 of receiver rail 26. Here, four surfaces 156 defined by groove 148 are configured to receive surfaces of end portion 110 of receiver rail 26.

Aperture 150 extends through mounting member 124 from a front surface 158 of mounting member 124 to groove 148. Aperture 150 is substantially perpendicular to surface 142, and substantially parallel to surfaces 140, 143. In another embodiment, aperture 152 extends from front surface 158 toward back surface 154 and is substantially coaxial with aperture 150. Both apertures 150, 152 are configured to receive a fastener such as a bolt for coupling receiver rail 26 to mounting member 124. Further, aperture 152 is configured to receive the head portion of the fastener so that the head portion of the fastener is recessed within mounting member 124 below surface 158.

Figure 27:
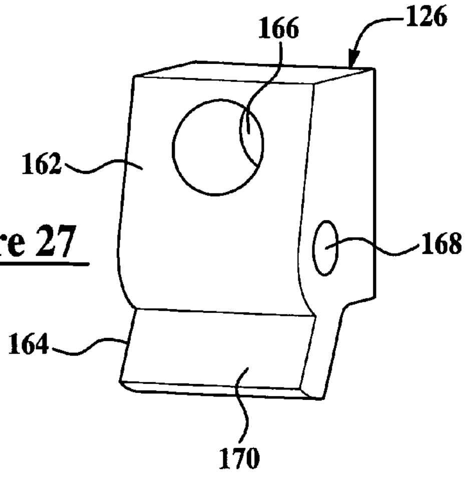
FIG. 27 is a perspective view of an engaging fitting of the first mounting assembly.

Referring to FIGS. 19, 20, and 27, engaging fitting 126 is illustrated. Engaging fitting 126 is configured to rotate about pin member 128 to urge a portion of engaging fitting 126 against a surface of groove 136 of frame member 32 to couple mounting member 124 to frame member 32. Engaging fitting 126 includes an upper portion 162 and a protrusion 164 depending away from upper portion 162. Upper portion 162 is configured to be received within groove 144 of mounting member 124. Upper portion 162 includes apertures 166 and 168. Aperture 166 extends through upper portion 162 and is configured to receive forcing member 130. In this embodiment, aperture 166 has a threaded interior surface configured to receive a threaded fastener or forcing member 130. Aperture 168 extends through upper portion 162 and is configured to slidably receive pin member 128. Protrusion 164 has at least one engaging surface 170 configured to contact surface 138 of groove 136 of frame member 32 when mounting assembly 28 is coupled to frame member 32.

A brief explanation of the operation of mounting assembly 28 will be provided. Referring to FIGS. 19 and 20, mounting assembly 28 is placed in a locked operational position by moving fastener or forcing member 130 against a surface 172 defined by groove 144 of mounting members 124. Continued rotation of forcing member 130 after it contacts surface 172 forces upper portion 162 of engaging fitting 126 to rotate about pin member 128 in a direction away from surface 172. As upper portion 162 rotates away from surface 172, surface 170 of protrusion 164 moves against surface 138 of slot or groove 136 of frame member 32. The locked operational position of mounting assembly 28 occurs when surface 170 of protrusion 164 is urged against surface 138 of groove 136 to couple mounting assembly 28 to frame member 32. The unlocked operational position of mounting assembly 28 occurs when forcing member 130 is moved away from surface 172 of mounting member 124 which rotates engaging fitting 126 such that surface 170 of protrusion 164 moves away from surface 138 of groove 136 of frame member 32.

Referring to FIG. 16, mounting assembly 30 is provided to couple receiver rail 24 to frame member 32. Mounting assembly 30 includes a mounting member 160, engaging fitting 126, pin member 128, and forcing member 130.

Figure 22:
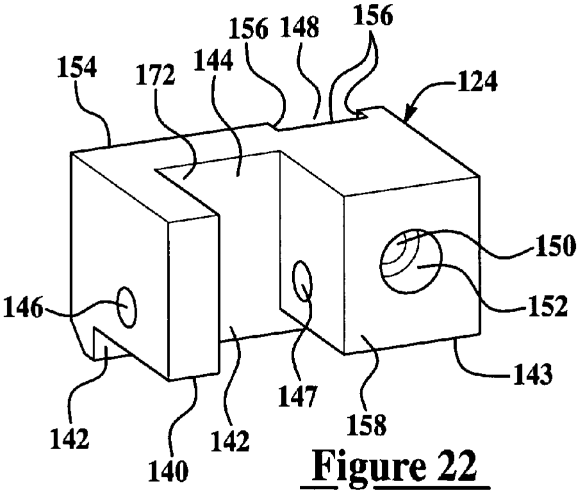
FIGS. 22-24 are perspective views of a first mounting member of the first mounting assembly of FIG. 20.
Figure 23:
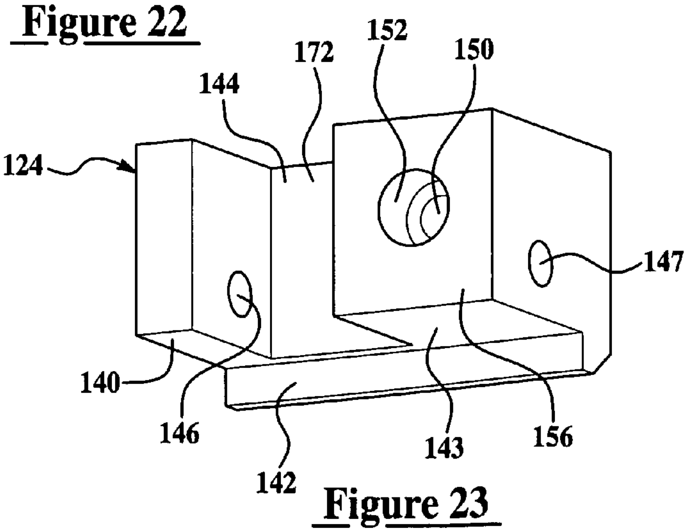
Figure 24:
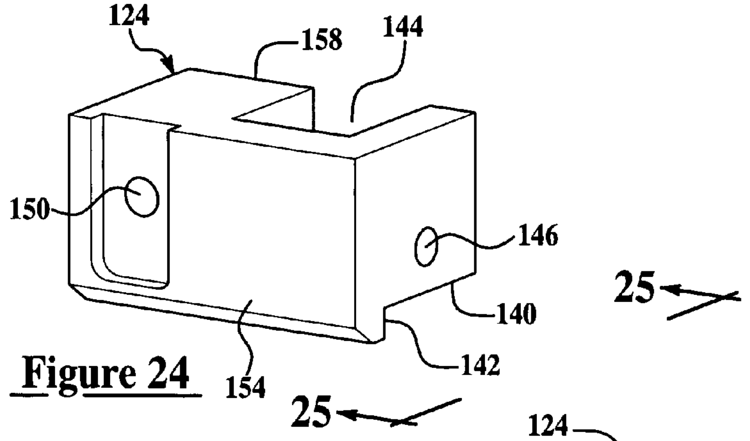
Figure 25:
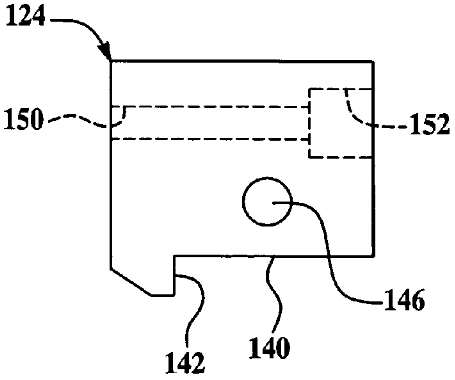
FIG. 25 is an end view along lines 25-25 of FIG. 24 of the first mounting member.
Figure 26:
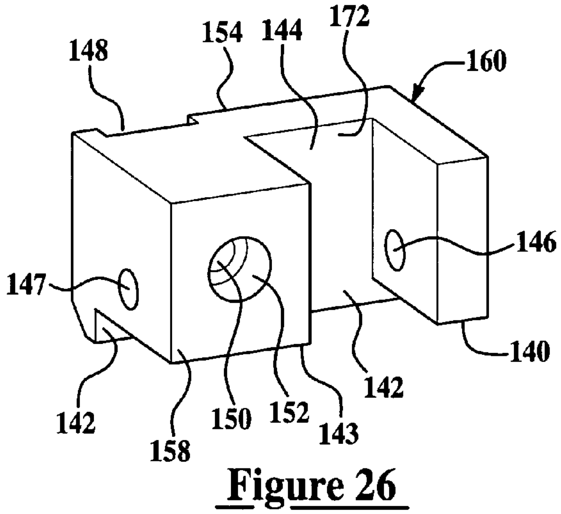
FIG. 26 is a perspective view of a second mounting member of a second mounting assembly.

An exemplary embodiment of mounting member 160 is illustrated in FIG. 26. Mounting member 160 is substantially similar to mounting member 124 except for the orientation of fastener apertures 150, 152 with respect to the channel shaped groove 144, as illustrated in FIGS. 16, 22, and 26. In this embodiment, end portion 104 of receiver rail 24 couples to groove 148 of mounting member 160.

Each of mounting assemblies 28, 30 is aligned to frame member 32 in three planes. Further, mounting assemblies 28, 30 are configured to accurately position receiver rails 24, 26 relative to frame members 32, 34. For example and with respect to mounting member 124, the configuration of mounting surfaces 140, 142, and 143 and surfaces 156 of groove 148 that receive end portion 110 of receiver rail 26 aids in positioning receiver rail 26 substantially perpendicular with respect to the three planes. The positioning includes accurately locating the configuration of lower blanking frame 16 in both the running and cross directions 20, 22.

Further, mounting assemblies 28, 30 can be easily repositioned along frame member 32 with respect to each other in the cross direction 22, due to the configuration of mounting assemblies 28, 30 and their engagement with slot 136 of frame member 32. Therefore, receiver rails 24, 26 can receive and be coupled with a variety of configurations of lower blanking frame 16. Further, once lower blanking frame 16 is coupled to receiver rails 24, 26, lower blanking frame 16 can be repositioned in the cross direction 22 without removing lower blanking frame 16 from receiver rails 24, 26 or removing fasteners. Lower blanking frame 16 coupled to receiver tool 18 can be easily repositioned along frame 32, 34 by uncoupling mounting assemblies 28, 30 from frame member 32 by urging forcing member 130 in a direction away from surface 172 of groove 144 of mounting members 124, 160.

Figure 28:
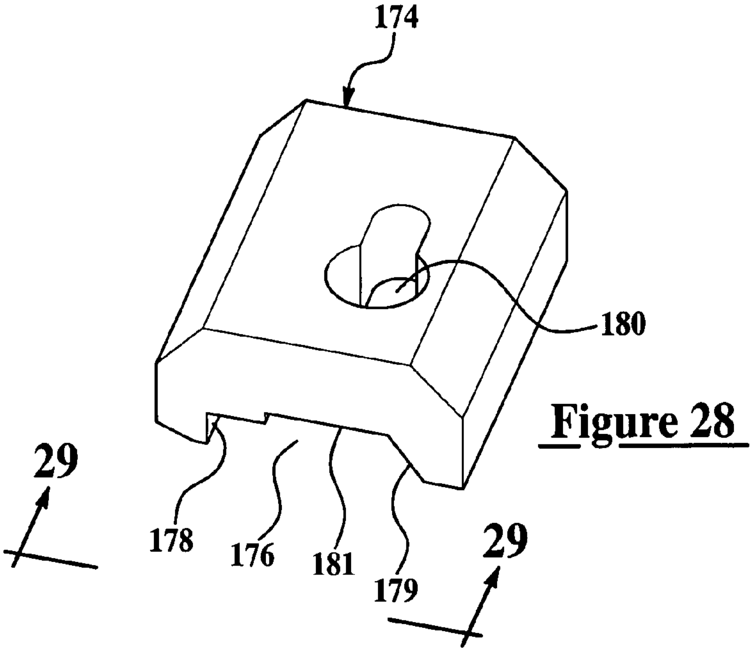
FIG. 28 is perspective view of a coupler used to couple a running rail to a receiver rail.
Figure 29:
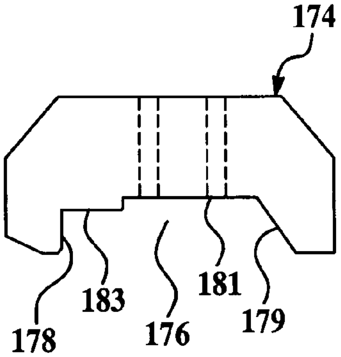
FIG. 29 is an end view along lines 29-29 of FIG. 28 of the coupler.

Referring to FIGS. 1, 28 and 29, a coupler 174 is configured to couple running rail 36 to receiver rail 24. Similarly, a coupler 175 is provided to couple running rail 38 to receiver rail 26. Coupler 175 is substantially similar to coupler 174, therefore only coupler 174 will be discussed. Coupler 174 includes a groove 176 defining a plurality of surfaces 178, 179, 181, 183 configured to engage upper surfaces of running rails 36 and or receiver rails 24.

Coupler 174 further includes a keyhole shaped aperture 180 extending through coupler 174 to groove 176. Aperture 180 is configured to receive a fastener that engages a threaded aperture (not shown) positioned in receiver rail 24. Before the fastener forces coupler 174 against receiver rail 24 and running rail 36, coupler 174 is moved in a direction that positions the smaller section of the keyhole aperture substantially around the fastener in a relatively tight fit. It should be noted that a plurality of couplers can be used to couple a running rail to a receiver rail.

A method of assembling a blanking tool 12 for use with the die cutting machine will now be explained. The method includes sliding mounting assemblies 28, 30 relative to each other along slot or groove 136 of frame member 32 to first and second positions, respectively, such that a distance between receiver rails 24, 26 substantially equals a distance between running rails 36, 38 of lower blanking frame 16. The method further includes placing mounting assembly 28 in a locked operational position to fixedly couple mounting assembly 28 to frame member 32. The method further includes placing mounting assembly 30 in a locked operational position to fixedly couple mounting assembly 30 to frame member 32. The method further includes disposing lower blanking frame 16 on receiver tool 18 such that running rail 36 is disposed alongside receiver rail 24 and running rail 38 is disposed alongside receiver rail 26. The method further includes coupling running rail 36 to receiver rail 24 using coupler 174. The method further includes coupling running rail 38 to receiver rail 26 using coupler 175.

Referring to FIG. 30, the blanking system 10 comprises blanking tool 12 coupled to frame 14 that is further coupled to die cutting machine 11. Die cutting machine 11 includes an upper punch tool 15 having two protruding punch members 17, 19. Punch members 17, 19 are configured to push a portion of a section of cardboard through an interior region defined by running rails 24, 26 and cross rails 40, 42 of blanking tool 12 toward a platform 21 disposed beneath blanking tool 12.

Lower blanking frame 16 of blanking tool 12 is configured to receive a substantial portion of punch members 17, 19. For example, in the exemplary embodiments discussed above, an interior region formed within running rail 36, cross rails 40, 42, and beam 98 is configured to receive a substantial portion of punch member 19. An interior region formed within running rail 38, cross rails 40, 42, and beam 98 is configured to receive a substantial portion of punch member 17. At least one of apertures 100, 103, 105, 109 of beam 98 is configured to permit a sensor to detect when the stacks of cardboard below blanking tool 12 are above a predetermined height. When a controller (not shown) receives a signal from the light sensor indicating the cardboard is stacked above the predetermined height, the controller generates a control signal to induce the platform 21 to be lowered.

Referring to FIGS. 31-34, a position-adjustment device 200 and a securement device 202 are illustrated in accordance with another exemplary embodiment. Position-adjustment device 200 is utilized to move a running rail 204 in the cross direction 22, thereby adjusting a position of a configuration of a lower blanking tool, for example, similar to lower blanking tool 16 of FIG. 2. Securement device 202 is utilized to couple running rail 204 to a receiver rail 206 after adjusting the position of the lower blanking tool. In an exemplary embodiment, position-adjustment device 200 is utilized for accurately adjusting the position of the lower blanking frame after the first and second mounting assemblies are coupled to frame member 32.

Figure 32:
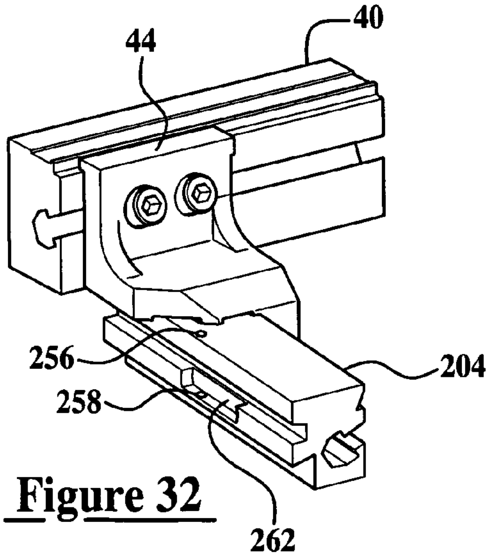
FIG. 32 is perspective view of the lower blanking frame of FIG. 31.

As illustrated in FIG. 32 only a portion of the lower blanking tool is shown, wherein the lower blanking tool includes running rail 204. In an exemplary embodiment, it is understood that the second running rail of the lower blanking tool is coupled to the second receiver rail utilizing a securement device substantially similar to securement device 202. Additionally and in another exemplary embodiment, another position-adjustment device is utilized at the second receiver rail to position the lower blanking tool. And in another exemplary embodiment, a coupler substantially similar to coupler 174 (shown in FIGS. 1 and 28) is utilized to couple a running rail to a receiver rail in addition to using a securement device for coupling the running rail to the receiver rail.

Figure 33:
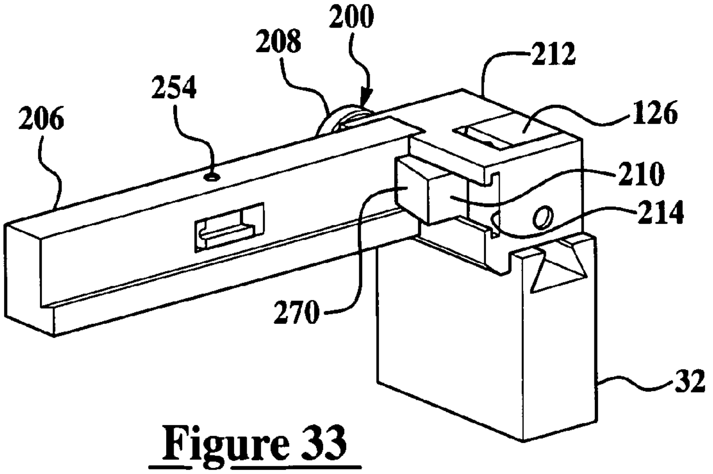
FIG. 33 is perspective view of a receiver rail, a mounting assembly, and a frame member of FIG. 31.
Figure 34:
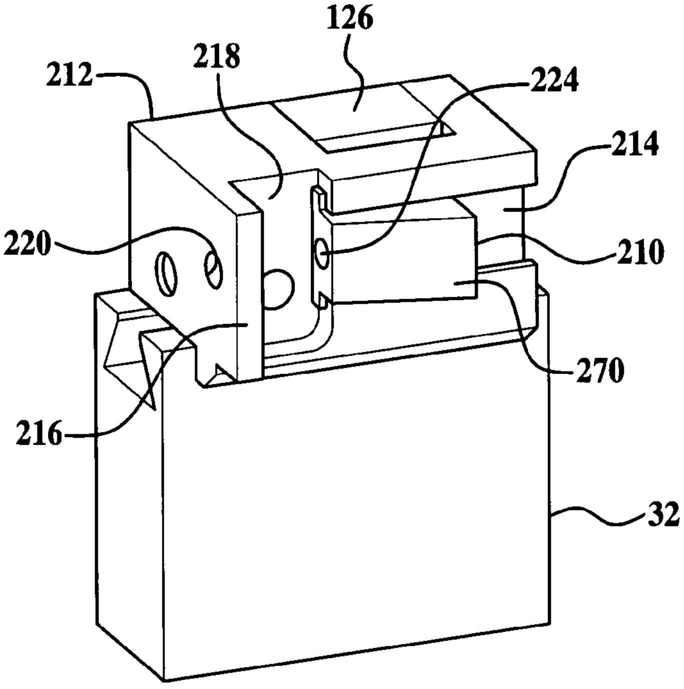
FIG. 34 is another perspective view of the mounting assembly and the frame member of FIG. 33.
Figure 37:
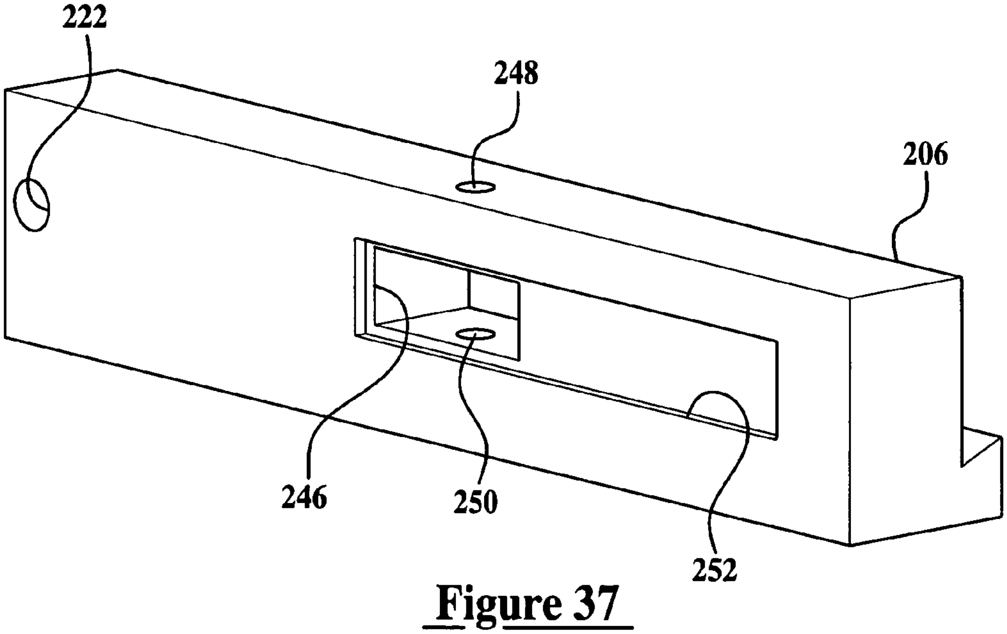
FIG. 37 is an enlarged perspective view of the receiver rail of FIG. 33.

Referring to FIGS. 33, 34 and 37 and in an exemplary embodiment, position-adjustment device 200 includes a screw 208 and a stop member 210. Position-adjustment device 200 is operably coupled to a mounting member 212. Mounting member 212 is substantially similar to mounting member 140 of FIG. 24 except configured to be utilized with position-adjustment device 200. Mounting member 212 includes a tee-shaped groove 214 and a wall portion 216. Tee-shaped groove 214 is configured to slidably receive a complementary portion of stop member 210. Mounting member 212 includes a groove 218 configured to receive an end portion of receiver rail 206. Wall portion 216 is adjacent to groove 218. Wall portion 216 includes an aperture 220 configured to receive a rod portion of screw 208, wherein a head portion of screw 208 abuts an outer surface of wall portion 216. A threaded rod portion of screw 208 extends through aperture 220, and further through an aperture 222 of receiver rail 206 and engages a threaded aperture 224 of stop member 210.

Figure 35:
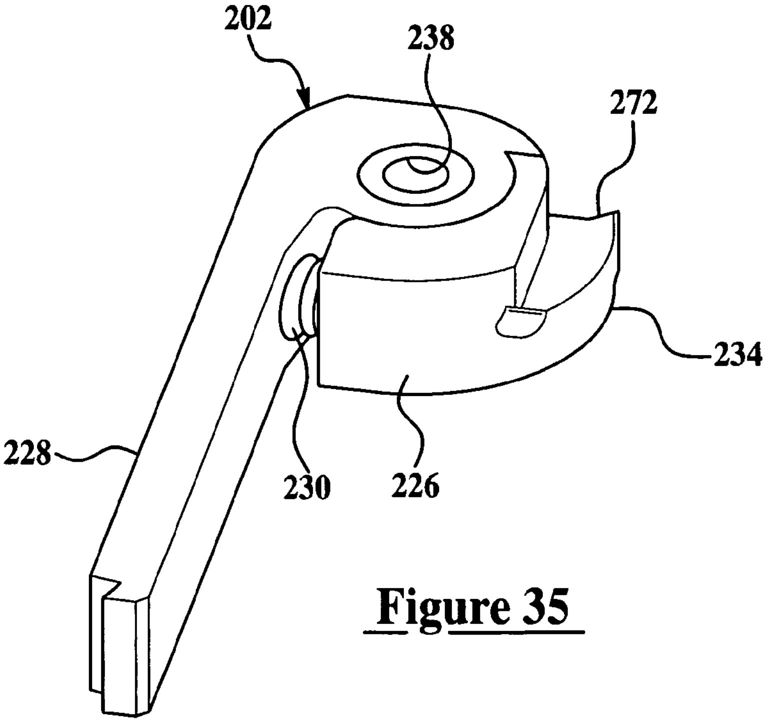
FIG. 35 is an enlarged perspective view of the securement device of FIG. 31.
Figure 36:
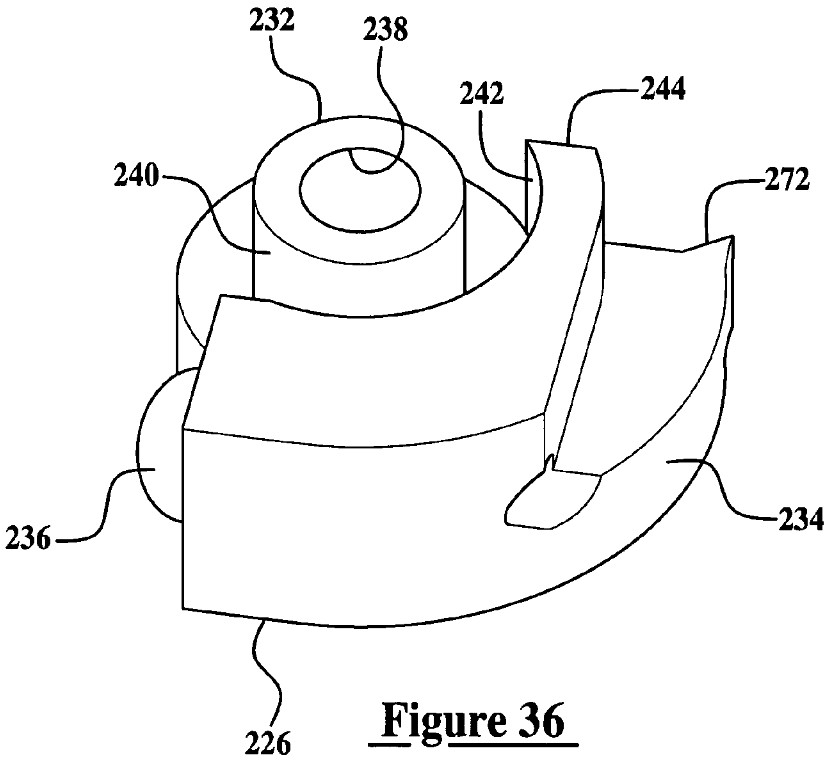
FIG. 36 is an enlarged perspective view of a rail engagement member of the securement device of FIG. 35.

Referring to FIGS. 35 and 36 and in an exemplary embodiment, securement device 202 includes a rail engagement member 226, a handle 228, and a spring member 230. Rail engagement member 226 includes protrusions 232, 234, and 236. Protrusion 232 includes an aperture 238 extending through rail engagement member 226. Protrusion 232 is configured to receive a portion of handle 228 such that surfaces of handle 228 abut surfaces 240, 242 and 244 of rail engagement member 226 when handle 228 is coupled to rail engagement member 226. Protrusion 234 is configured to engage a portion of running rail 204 when running rail 204 is coupled to receiver rail 206 via securement device 202. Protrusion 236 extends away from rail engagement member 226 in a direction toward handle 228. Protrusion 236 is further configured to receive a portion of spring member 230 to bias handle 228 away from rail engagement member 226 when handle 228 is coupled to rail engagement member 226.

Referring to FIG. 37, receiver rail 206 is configured to receive securement device 202. Receiver rail 206 includes apertures 222, 246, 248, 250 and recess 252. Aperture 222 is configured to receive the rod portion of screw 208. Aperture 246 is configured to rotably receive rail engagement member 226 and a portion of handle 228. Apertures 248 and 250 are configured to fixedly receive a pin member 254 (shown in FIG. 31) so handle 228 and rail engagement member 226 rotate about pin member 254. Recess 252 is configured to receive a portion of handle 228 when handle 228 is rotated to a clamped position thereby coupling running rail 204 to receiver rail 206, as illustrated in FIG. 31.

Figure 31:
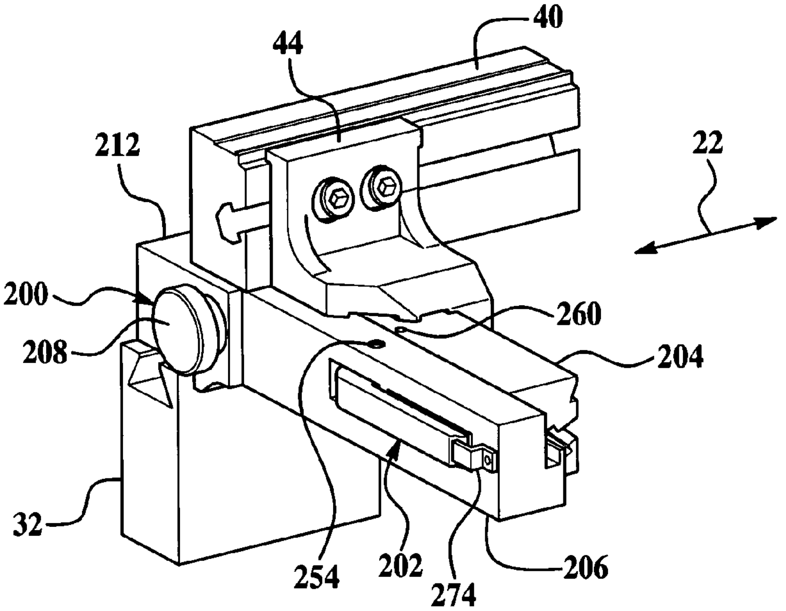
FIG. 31 is perspective view of a position-adjustment device for positioning a lower blanking frame and of a securement device for securing the lower blanking frame in accordance with an alternative exemplary embodiment.

Referring to FIGS. 31 and 32, running rail 204 includes apertures 256 and 258 configured to fixedly receive a pin member 260 therein. Pin member 260 is provided so rail engagement member 226 abuts against pin member 260 when handle 228 is rotated to the clamped position. Running rail 204 further includes a groove 262 configured to receive protrusion 234 of rail engagement member 226 when securement device 202 is at the clamped position.

In an exemplary embodiment, the lower blanking tool is positioned between the receiver rails and secured to the receiver rails utilizing position-adjustment device 200 and securement device 202. First, the lower blanking tool is positioned such that an end portion of running rail 204 abuts a slanted surface 270 of stop member 210. Screw 208 is then rotated either in a clockwise or counterclockwise direction to adjust a position of stop member 210 within tee-shaped groove 214 of mounting member 212. A position of running rail 204 is changed due to contact between running rail 204 and stop member 210 at slanted surface 270, thereby changing a position of the lower blanking tool in the cross direction 22. In one exemplary embodiment, the position of the lower blanking tool is adjusted in the cross direction 22 in a range of +/−3 mm. After positioning the lower blanking tool between the first and second receiver rails, securement device 202 is utilized to coupled the running rail to the receiver rail. For example, handle 228 is rotated until rail engagement member 226 engages groove 262 of running rail 204 and a surface 272 of rail engagement member 226 contacts pin member 260 within running rail 204. A handle stop 274 coupled to running rail 204 is then moved to a position to maintain handle 228 against spring member 230, thereby also maintaining rail engagement member 226 against pin member 260 to fix running rail 206 against slanted surface 270 of stop member 210.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A blanking tool for use with a die cutting machine, the die cutting machine connectable to first and second frame members disposed in a substantially parallel spaced relationship with respect to one another, the first frame member having a slot extending therealong , the blanking tool comprising:

- a lower blanking frame having first and second running rails and first and second cross rails, the first running rail extending in a first direction, the second running rail disposed in a substantially parallel spaced relationship with respect to the first running rail, the first cross rail extending in a second direction substantially perpendicular to the first running rail and coupled to the first and second running rails, the second cross rail disposed in a substantially parallel spaced relationship with respect to the first cross rail and coupled to the first and second running rails;
- a receiver tool having a first receiver rail generally parallel to the first running rail and having a length, a second receiver rail generally parallel to the second running rail, and first and second mounting assemblies, the first receiver rail in direct slidable contact with and supporting the first running rail, the first receiver rail having a first end portion and a second end portion, the first end portion coupled to the first mounting assembly that is further connectable to the first frame member, the second end portion receiveable on the second frame member, the second receiver rail in direct slidable contact with and supporting the second running rail, the second receiver rail having a third end portion and a fourth end portion, the third end portion coupled to the second mounting assembly that is further connectable to the first frame member, the fourth end portion receiveable on the second frame member; and
- the first and second mounting assemblies being configured to slidably engage the slot of the first frame member such that the first and second mounting assemblies can slide along a length of the slot relative to one another when the first and second mounting assemblies have an unlocked operational position;

wherein:

- the first receiver rail further includes a generally V-shaped groove generally parallel to the first running rail and a protrusion extending along the length thereof generally parallel to the groove;
- the first running rail includes a generally V-shaped groove generally parallel to the first running rail and a protrusion extending along the length thereof and being generally parallel to the groove in the first receiver rail;
- the groove in the first receiver rail receiving the protrusion of the first running rail; and
- the groove in the first running rail receiving the protrusion of the first receiver rail.

2. The blanking tool of claim 1 wherein the second receiver rail includes groove and wherein the second running rail includes a protrusion, the groove in the second receiver rail adapted for receiving the protrusion of the second running rail therein.

3. The blanking tool of claim 2 wherein the second running rail includes groove and wherein the second receiver rail includes a protrusion, the groove in the second running rail adapted for receiving the protrusion of the second receiver rail therein.

4. The blanking tool of claim 1 further comprising a first datum operatively connected to the first receiver rail, the first datum adapted for aligning the first running rail with respect to the first receiver rail.

5. The blanking tool of claim 4 further comprising a second datum operatively connected to the second receiver rail, the second datum adapted for aligning the second running rail with respect to the second receiver rail.

6. The blanking tool of claim 4 wherein the first running rail includes a first end and wherein first datum includes an adjustable stop member engageable with the first end of the first running rail, the stop member movable between a first position wherein the first running rail is in a first location and a second position wherein the first running rail is in a second location.

* * * * *